United States Patent [19]
Kincaid et al.

[11] Patent Number: 5,839,845
[45] Date of Patent: Nov. 24, 1998

[54] ADJUSTABLE TORQUE PIVOT JOINT

[75] Inventors: Jeffrey L. Kincaid, Clarkston; Brian A. Mattila, Fenton, both of Mich.; Thomas J. Miller, Alden, N.Y.; Kenneth G. Kraft, Warren, Mich.

[73] Assignee: American Axle & Manufacturing, Detroit, Mich.

[21] Appl. No.: 754,546

[22] Filed: Nov. 21, 1996

Related U.S. Application Data

[63] Continuation-in-part of Ser. No. 595,689, Feb. 2, 1996, abandoned.

[51] Int. Cl.⁶ .................................................. F16C 11/06
[52] U.S. Cl. .......................... 403/135; 403/122; 403/137; 29/437; 29/509
[58] Field of Search ............................. 403/122, 76, 77, 403/135, 136, 137, 140, 142, 143, 138; 29/898.045, 898.044, 898.048, 898.049, 898.05, 434, 436–437, 441.1, 509, 515; 280/674, 95.1

[56] References Cited

U.S. PATENT DOCUMENTS

| | | | |
|---|---|---|---|
| 1,835,154 | 12/1931 | Hufferd | 403/135 X |
| 1,993,156 | 3/1935 | Flumerreut | 403/138 |
| 2,761,715 | 9/1956 | Horberg et al. | 403/135 X |
| 3,902,816 | 9/1975 | Moore | 403/137 X |
| 4,120,597 | 10/1978 | Millard | 403/138 X |

FOREIGN PATENT DOCUMENTS

| | | | |
|---|---|---|---|
| 813920 | 3/1937 | France | 403/140 |
| 1014394 | 8/1957 | Germany | 403/135 |
| 753234 | 7/1986 | United Kingdom | 403/138 |

*Primary Examiner*—Harry C. Kim
*Attorney, Agent, or Firm*—Reising, Ethington, Learman & McCulloch

[57] ABSTRACT

A preloaded pivot joint has a threaded ball seat that is screwed into an open end of the joint housing to adjust the axial load on the ball stud and consequent torque characteristics. The adjusted position of the ball seat is then maintained by swaging the joint housing inwardly to engage a hexagonal portion of the ball seat that is used to screw the ball seat into the housing.

19 Claims, 4 Drawing Sheets

ADJUSTABLE TORQUE PIVOT JOINT

This is a continuation-in-part of U.S. patent application Ser. No. 08/595,659 filed Feb. 2, 1996, now abandoned

BACKGROUND OF THE INVENTION

This invention relates generally to pivot joints and more particularly to preloaded pivot joints that have a ball stud that rotates and angulates with respect to the joint housing. Such pivot joints are typically used in automotive steering linkage systems.

A known preloaded pivot joint comprises a ball stud having a ball head that is disposed in a close ended joint housing and engaged by a ball seat that is inserted telescopically into an open end of the joint housing. The ball seat is then pushed against the ball head to compress a preload spring on the opposite side of the ball head. The ball seat is then retained in this preload position by swaging the open end of the joint housing inwardly against a hexagonal portion of the ball seat. The swaging operation results in high torque characteristics requiring a secondary operation in which the outer wall of the joint housing is crimped inwardly at several circumferentially spaced locations to reduce the torque characteristics to an acceptable level.

U.S. Pat. No. 3,892,336 granted to Edward J. Herbenar Jun. 24, 1975 shows a somewhat similar arrangement. The Herbenar patent discloses a ball joint in which a lug is telescopically inserted into the open end of the ball joint housing and pushed against a coil spring to preload the pivot joint as shown in FIG. 1 of the Herbenar patent. The housing is then swaged inwardly against male threads on the periphery of the plug to lock the plug in place as shown in FIG. 2 of the Herbenar patent. The Herbenar ball joint has more or less the same drawback as the known pivot joint described above. Namely the swaging operation results in high torque characteristics.

The Herbenar patent does not specify a secondary crimping operation to relieve the preload. Instead, the Herbenar ball joint provides for subsequent adjustment of the threaded plug after the swaging operation. The after the fact adjustment still requires a secondary operation and furthermore the arrangement does not prevent tampering with the desired torque characteristics once the adjustment is made.

The U.S. Pat. No. 4,187,033 granted to Leonard J. Zukowski discloses a variably preloaded ball joint assembly comprising a threaded plug or disc. The threaded plug is screwed into the ball joint housing to a preload position where it axially presses an elastomeric element toward the ball end with sufficient force to provide a predetermined preload of the ball end as described in column 3, lines 39–45 of the Zukowski patent specification. After the disc is properly positioned for proper pre-loading it is locked into position against rotation by staking the threads through a lateral opening in the housing as shown in FIG. 3 of the Zukowski patent. This arrangement has several drawbacks. First the arrangement requires a lateral opening which tends to weaken the housing and introduce sealing problems. Secondly, the retention is relatively weak as evidenced by the fact that the disc need only withstand the preloading force prior to installation of the ball joint. Alternatively thread locking chemicals may be used according to column 3, lines 55–66 of the Zukowski patent specification. However, in either event, an elongated housing is required for the threaded end of a rack bar which is needed to withstand the compressive forces during operation of the ball joint in the steering linkage system.

British Patent Specification 753,234 published Jul. 18, 1956 discloses a ball joint comprising a moveable ball seat in a housing that is held against the ball head of a stud by a dish-like plug that is screwed into the bottom of the housing. The plug has an annular groove that holds a compression spring that engages the moveable ball seat to take up wear. The bottom face of the plug has a diametrical groove. When the plug is positioned to effect the desired pressure on the ball head, edge portions of the housing are peened over into the ends of the diametrical groove to prevent the plug from rotating in the housing.

This arrangement also has several drawbacks. First the plug interlock with the housing is relatively weak as evidenced by the fact that the peening on the bottom of the housing can be removed so that the plug can be readjusted. Moreover the diametrical groove of the plug and the peened portions of the housing are totally exposed and consequently the adjusted torque characteristics of the joint can be tampered with easily.

SUMMARY OF THE INVENTION

The object of this invention is to provide an adjustable torque pivot joint that is compact, rugged and tamper resistant.

A feature of the invention is that the adjustable torque pivot joint has a threaded plug that is screwed into the joint housing to provide the proper torque characteristics and then retain in an adjusted position by a swaging operation that provides a strong interlock between threaded plug and the joint housing.

Another feature of the invention is that the adjustable torque pivot joint has a screw-in plug that is adjusted to provide the proper torque characteristics and then maintained in the adjusted position by swaging the housing inwardly to engage an out-of-round portion of the ball plug.

Still another feature of the invention is that the adjustable torque pivot joint has a screw-in plug that is maintained in an adjusted position to provide the proper torque characteristics by swaging the housing inwardly to engage and disable a tool engaging portion of the plug.

Yet another feature of the invention is that the adjustable torque pivot joint has a screw-in plug for providing the proper torque characteristics that is maintained in an adjusted position by deformed portions of a joint housing that is easy to seal.

Still yet another feature of the invention is that the adjustable torque pivot joint has a screw-in plug for providing the proper torque characteristics that is maintained in an adjusted tamper-proof position by deformed portions of the housing.

BRIEF DESCRIPTION OF THE DRAWINGS

The above and other objects, features and advantages of the invention will become more apparent from the following description taken in conjunction with the accompanying drawings wherein like references refer to like parts and therein.

DESCRIPTION OF THE INVENTION

Figure 1:
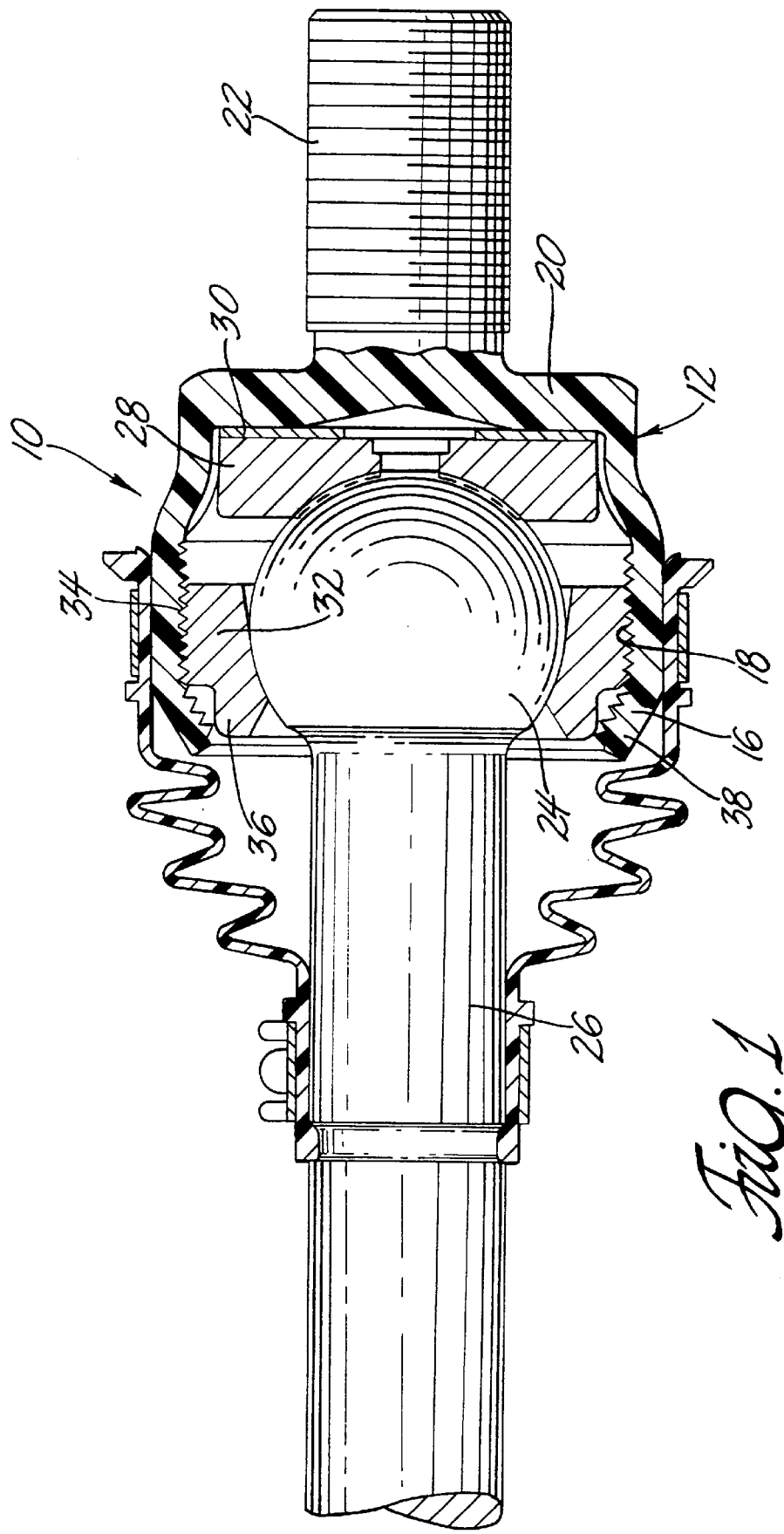
FIG. 1 is a partially sectioned elevation view of a preloaded pivot joint in accordance with the invention after complete manufacture.
Figure 2:
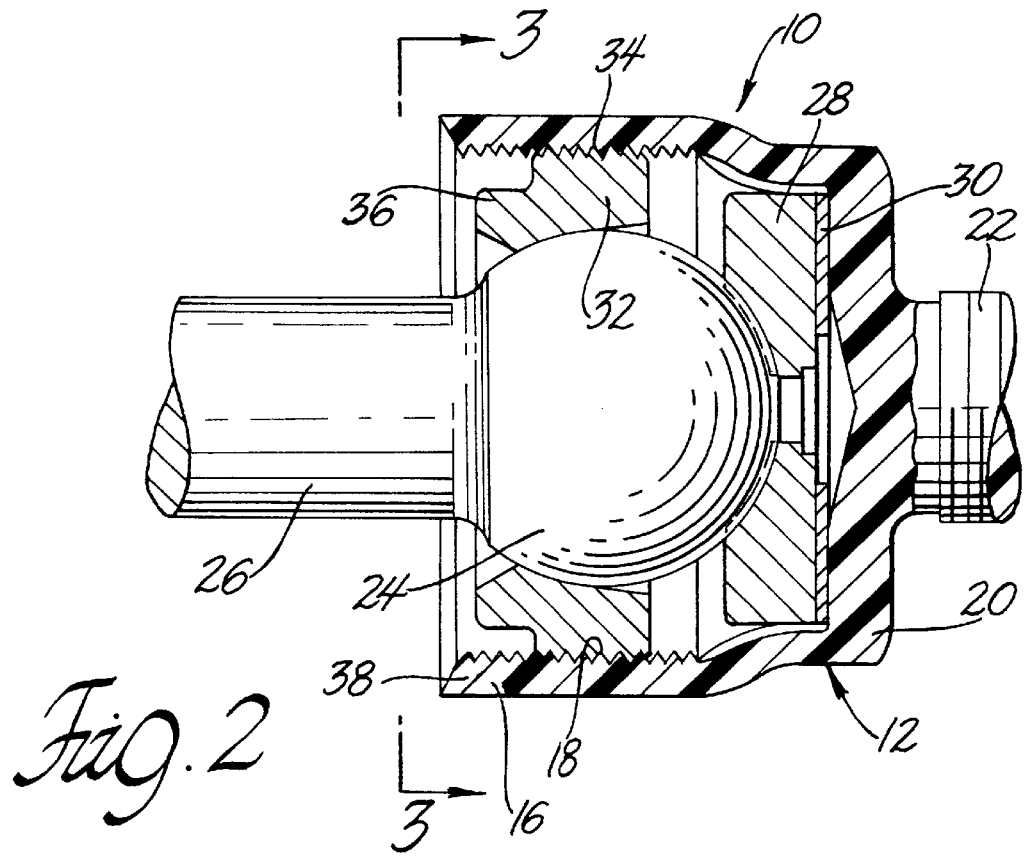
FIG. 2 is a partially sectioned elevation view of a preloaded pivot joint in accordance with the invention during a stage of manufacture.
Figure 3:
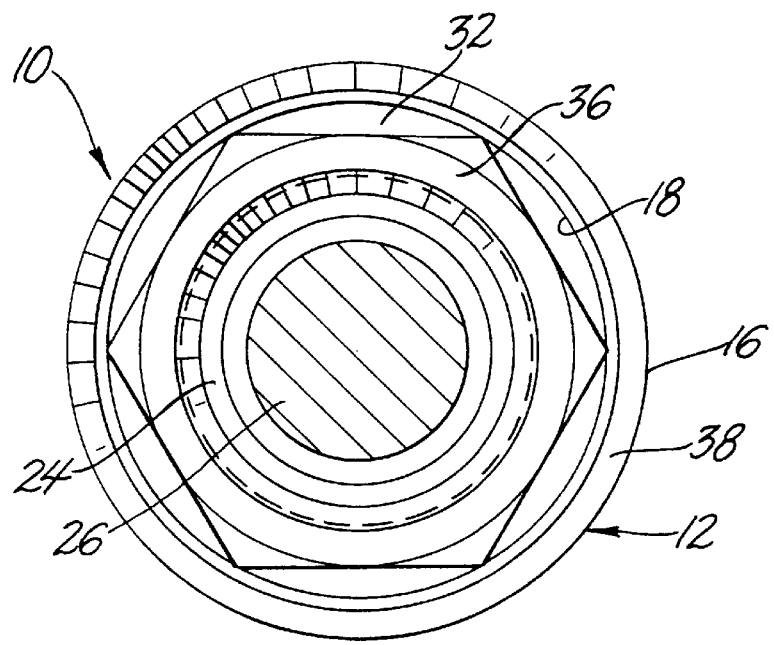
FIG. 3 is a section taken substantially along the line 3—3 of FIG. 2 looking in the direction of the arrows.

Referring now to the drawing, FIGS. 1, 2 and 3 illustrate a pivot joint 10 of the invention comprising a housing 12 and a stud 14 that rotates and angulates with respect to the housing 12.

The housing 12 has an open end 16 that is internally threaded at 18 and a closed end 20. The closed end 20 includes an external connector 22 in the form of a threaded shank for connecting the housing 12 to another member of a steering linkage system (not shown).

The stud 14 has a ball head 24 at the end of a shank 26. The ball head 24 is disposed inside the housing 12 where the free or round end of the ball head 16 engages a disk-like bearing seat 28. The bearing seat is disposed in the closed end of the housing 12 and engages a spring 30 in the form of a Belleville washer that is trapped between the bearing seat 28 and the end wall of the housing 12.

The pivot joint 10 further includes an annular bearing seat 32 that engages the opposite end of the ball head 24 that merges into the shank 26. The annular bearing seat 32 is an integral part of an annular plug 33. Plug 33 has a cylindrical wall that has external threads 34 that engage the internal threads 18 of the housing 12. Plug 33 also includes a hexagonal portion 36 that is well within the outline of the cylindrical wall that is threaded at 34 as best shown in FIG. 2. The open end 16 of the housing 12 has a lip 38 that is deformed radially inwardly at the hexagonal portion 36 of the plug 33. The preloaded pivot joint further includes an elastomeric boot seal 40 that has one end clamped to a round median portion of the housing 12 above the deformed lip 38. The opposite end of the boot seal 40 is clamped to a round portion of the stud shank 26.

The pivot joint 10 is initially assembled with the lip 38 in an undeformed state, that is, the lip 38 is shaped so that the plug 33 and integral annular bearing seat 32 can be screwed into the threaded end of the housing 12 as shown in FIG. 2. As the plug 33 is screwed into the open end of the housing 12, the annular bearing seat 32 pushes the ball head 24 against the bearing seat 28 compressing the spring 30 to preload the pivot joint 10. The plug 33 is screwed into the open threaded end of the housing 12, until the desired preload is achieved which in turn provides the desired torque characteristic of the pivot joint 10. This adjusted position of the annular, screw-in plug 33 is then maintained by permanently deforming the lip 38 of the metal housing 12 radially inwardly as shown in FIG. 1.

The hexagonal portion 36 is used to screw the annular bearing seat 32 into the housing 12 during initial assembly and during the adjustment process. The hexagonal portion 36 provides a tool engaging surface so that the plug 32 with its integral bearing seat 32 can be screwed into the housing 12 by machine as well as manually. Moreover, the deformed lip 38 not only maintains the adjustment but also clovers the flat surfaces of the hexagonal portion 36 and traps the corners between the flat surfaces so that the adjustment is tamper proof.

Referring now to FIGS. 4, 5, 6 and 7 of the drawing, there is illustrated a second pivot joint 110 of the invention comprising a housing 112 and a stud 114 that rotates and angulates with respect to the housing 112.

Figure 4:
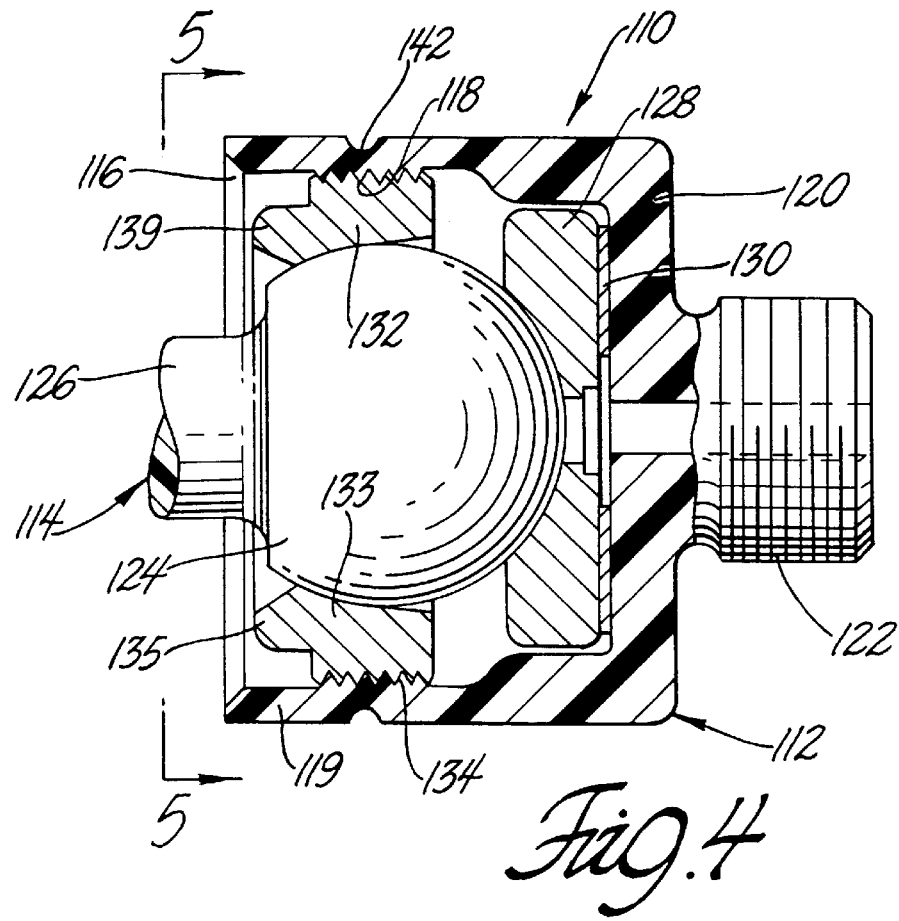
FIG. 4 is a partially sectional elevation view of a second preloaded pivot joint in accordance with the invention in a stage of manufacture.
Figure 5:
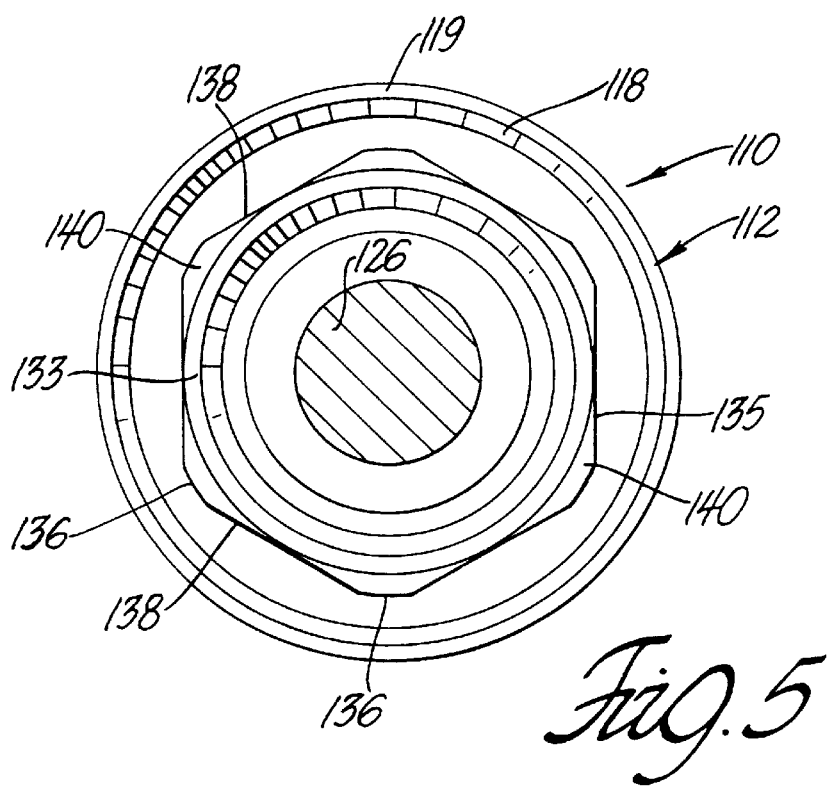
FIG. 5 is a section taken substantially along the line 5—5 of FIG. 4 looking in the direction of the arrows.

The housing 112 has an open end 116 that is internally threaded at 118 and a closed end 120. The open end 116 is initially defined by a deformable, threadless, cylindrical lip 119 of circular cross section as shown in FIGS. 4 and 5. The closed end 120 includes an external connector 122 in the form of a threaded shank for connecting the housing 112 to another member of a steering linkage system (not shown).

The stud 114 has a ball head 124 at the end of a shank 126. The ball head 124 is disposed inside the housing 112 where the free or round end of the ball head 116 engages a disk-like bearing seat 128. The bearing seat is disposed in the closed end of the housing 112 and engages a spring 130 in the form of a Belleville washer that is trapped between the bearing seat 128 and the end wall of the housing 112.

The pivot joint 110 further includes an annular bearing seat 132 that engages the opposite end of the ball head 124 that merges into the shank 126. The annular bearing seat 132 is an integral part of an annular plug 133. Plug 133 has a cylindrical wall that has external threads 134 that engage the internal threads 118 of the housing 112.

The annular plug 133 also includes a tool engaging portion 135 that is spaced radially inwardly of and well within the outline of the cylindrical lip 119 in its original undeformed state as best shown in FIGS. 4 and 5.

The tool engaging portion 135 has a concentric perimeter wall that is generally hexagonal comprising six curved portions 136 that are equally circumferentially spaced and preferably equal, concentric arc segments. Arc segments 136 are joined by six equal, circumferentially spaced flat sides or chord segments 138.

The curved portions or arc segments 136 remove the sharp corners of a regular hexagon and reduce the radial spacing of the six flat sides 138 from an inscribing cylinder. This provides an advantage in disabling the tool engaging portion 135 as explained below.

The outer edge 139 of the tool engaging portion 135 is preferably chamfered so that the end surface has beveled lands 140 located outside an imaginary circular cylinder inscribed by the six flat sides or chord segments 138. These beveled lands 140 eliminate sharp edges between the end surface and the perimeter wall of the tool engaging portion 135 to facilitate deformation of the cylindrical lip 119.

Figure 6:
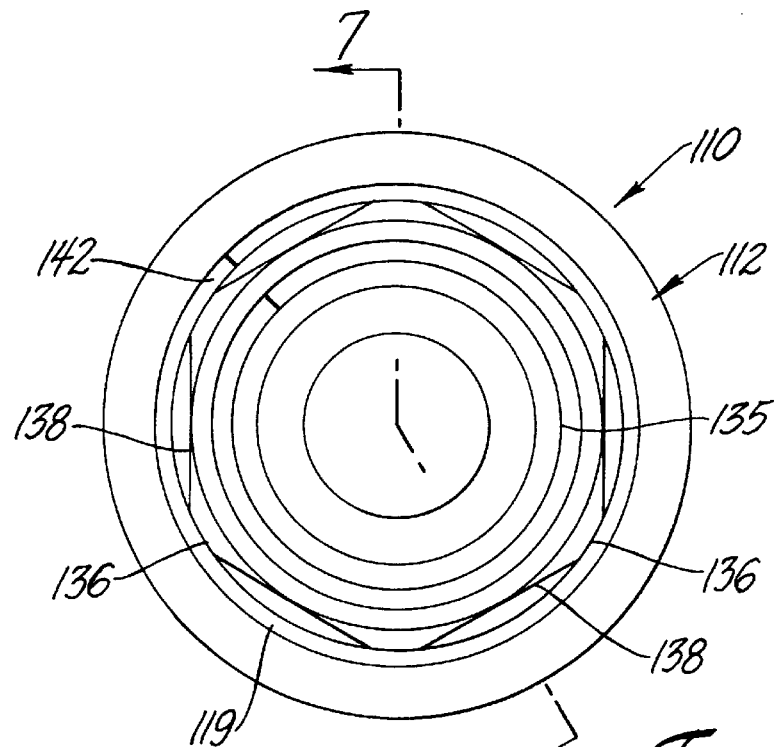
FIG. 6 is a section similar to FIG. 5 showing the second preloaded pivot joint of FIG. 4 in a later stage of manufacture.
Figure 7:
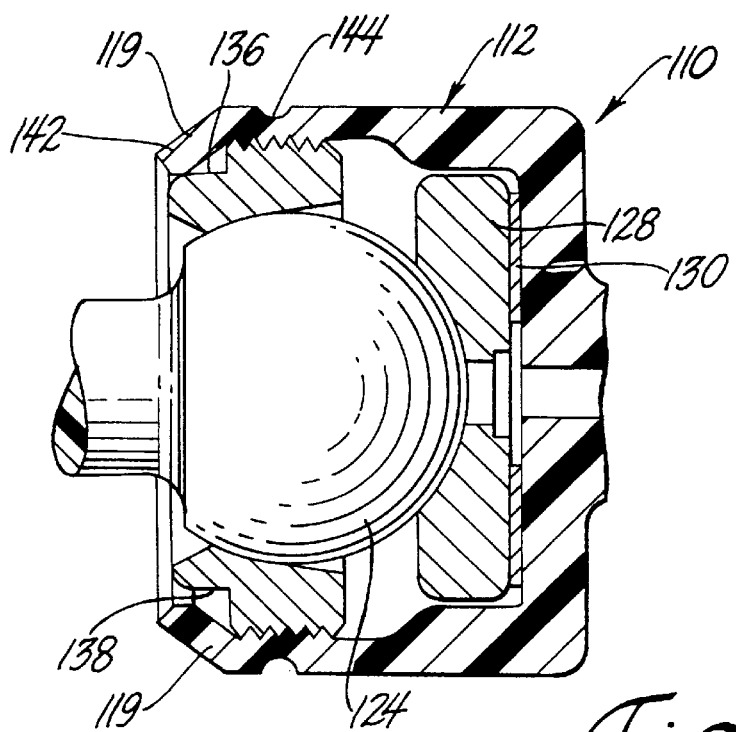
FIG. 7 is a section taken substantially along the line 7—7 of FIG. 6 looking in the direction of the arrows.

The pivot joint 110 is initially assembled with the lip 119 in an undeformed state, that is, the lip 119 is shaped as a cylinder of circular cross section so that the annular plug 133 can be screwed into the threaded end of the housing 112 as shown in FIGS. 4 and 5. As the annular plug 133 is screwed into the open end of the housing 112, the annular bearing seat 132 pushes the ball head 124 against the bearing seat 128 compressing the spring 130 to preload the pivot joint 110. The plug 133 is screwed into the open threaded end of the housing 112, until the desired preload is achieved which in turn provides the desired torque characteristic of the pivot joint 110. This adjusted position of the annular, screw-in plug 133 is then maintained by permanently deforming the cylindrical lip 119 of the metal housing 112 radially inwardly by a swaging operation that progressively reduces the entire cylindrical wall and diameter of the lip 119 substantially uniformly into tight wedging engagement with the tool engaging portion 135 as shown in FIGS. 6 and 7. Thus the swaged lip converges in a conic or spherical like manner to a reduced diameter end portion 142 of circular cross section engages the several arc segments 136 to provide a strong interlock between the housing 112 and the annular plug 133 that maintains the adjusted position of the plug 133. The arc segments 136 preferably bite or dig into the reduced diameter end portion 142 of the swaged lip.

The tool engaging portion 135 is initially spaced from the undeformed cylindrical lip 119 as shown in FIGS. 4 and 5 and is used to screw the annular plug 133 into the housing 112 during initial assembly and during the adjustment process either manually or by machine. However, after adjustment is completed, the reduced diameter end portion 142 of swaged lip 119 fixes the position of the plug 133 to maintain the adjustment and also disables the tool engaging portion 135 so that the adjustment is tamper proof.

To achieve disablement, the swaged lip 119 substantially covers the tool engaging portion 135 and prevents the tool access. Gaps may and in fact do occur between the flat sides 138 and the juxtaposed reduced diameter end portion 142. However, these gaps are not large enough to permit the use of conventional wrenches or spanner tools. Moreover as indicated above, the arc segments 136 reduce the size of the gaps and the gaps can be reduced to a size that prevents any tool access for all practical purposes simply by increasing the length of the arc segments 136.

The preloaded pivot joint 110 further includes an elastomeric boot seal (not shown) that has one end clamped to a round median portion of the housing 112 equipped with a seal mounting groove 144 and an opposite end clamped to a round portion of the stud shank 126.

In each of the particular embodiments described above, the annular bearing seats 32 or 132 is an integral part of the annular adjustment plug 33 or 133. This is the preferred arrangement because it reduces complexity and expense. However, the annular bearing seat 32 or 132 and the annular adjustment plug 33 or 133 can be made as separate pieces. Moreover, while tool engaging portions 36 and 135 of two particular shapes have been illustrated, other out-of-round shapes are also possible, such as a polyhedron or a round cylinder with any number of flat surfaces. Furthermore the pivot joint may use another type of wear take-up spring in place of the Belleville washer that has been illustrated, or forego the use of a wear take-up spring altogether in which case one of the bearing seats may be an integral part of the housing 12 or 112. In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than a specifically described.

The embodiments of the invention in which an exclusive property or privilege is claimed are defined as follows:

We claim:

1. An adjustable torque pivot joint comprising:

a housing having a portion that is internally threaded and a deformable lip, a stud having a ball head that is retained in the housing so that the stud rotates and angulates with respect to the housing, a first bearing seat in the housing engaging an end of the ball head of the stud, a second bearing seat in the housing engaging an opposite end of the ball head of the stud, and a threaded plug that threadably engages the internally threaded portion of the housing and that has a peripheral, out of round, outwardly facing tool engaging surface for screwing the threaded plug to an adjusted position in the housing so that the bearing seats are biased into engagement with the ball head with desirable torque characteristics, and the deformable lip engaging and encircling the outwardly facing tool engaging surface of the plug in a deformed state to maintain and to prevent tampering with the adjusted position of the threaded plug.

2. The adjustable torque pivot joint as defined in claim 1 wherein the second bearing seat is an integral part of the threaded plug.

3. The adjustable torque pivot joint as defined in claim 1 wherein the deformable lip disables the tool engaging surface in the deformed state to prevent tampering with the adjusted position of the threaded plug.

4. The adjustable torque pivot joint as defined in claim 3 wherein the tool engaging surface is generally hexagonal.

5. The adjustable torque pivot joint as defined in claim 3 wherein the deformable lip substantially covers the tool engaging surface in the deformed state.

6. The adjustable pivot joint as defined in claim 1 wherein the plug is annular and the stud has a shank that commences adjacent the annular plug and the deformable lip.

7. An adjustable torque pivot joint comprising:

a housing having a portion that is internally threaded and a deformable lip, a stud having a ball head that is retained in the housing so that the stud rotates and angulates with respect to the housing, a first bearing seat in the housing engaging an end of the ball head of the stud, a second bearing seat in the housing engaging an opposite end of the ball head of the stud, and a threaded plug that threadably engages the internally threaded portion of the housing and that has a peripheral, out of round, tool engaging surface for screwing the threaded plug to an adjusted position in the housing so that the bearing seats are biased into engagement with the ball head with desirable torque characteristics, the deformable lip engaging the tool engaging surface of the plug in a deformed state to maintain the adjusted position of the threaded plug, the deformable lip disabling the tool engaging surface in the deformed state to prevent tampering with the adjusted position of the threaded plug, and the tool engaging surface having a plurality of circumferentially spaced curved surfaces that are engaged by the deformable lip in the deformed state and a plurality of circumferentially spaced flat walls.

8. An adjustable torque pivot joint comprising:

a housing having a portion that is internally threaded and a deformable lip, a stud having a ball head that is retained in the housing so that the stud rotates and angulates with respect to the housing, a first bearing seat in the housing engaging an end of the ball head of the stud, a second bearing seat in the housing engaging an opposite end of the ball head of the stud, and a threaded plug that threadably engages the internally threaded portion of the housing and that has a peripheral, out of round, tool engaging surface for screwing the threaded plug to an adjusted position in the housing so that the bearing seats are biased into engagement with the ball head with desirable torque characteristics, the deformable lip engaging the tool engaging surface of the plug in a deformed state to maintain the adjusted position of the threaded plug, the deformable lip substantially covering and disabling the tool engaging surface in the deformed state to prevent tampering with the adjusted position of the threaded plug; and the deformable lip being a cylinder of circular cross section that is deformed radially inwardly to provide a reduced diameter end portion of circular cross section that engages the tool engaging surface.

9. An adjustable torque pivot joint comprising:

a housing having a closed end, an open end, an internally threaded portion and a deformable lip at the open end, a stud having a shank and a ball head at the end of the shank that is retained in the housing so that the stud rotates and angulates with respect to the housing, a disk-like bearing seat in the closed end of the housing engaging an end of the ball head of the stud, a spring disposed between the disk-like bearing seat and a wall at the closed end of the housing, an annular bearing seat in the housing engaging an opposite end of the ball head of the stud adjacent the shank, the annular bearing seat having an externally threaded portion that engages the internally threaded portion of the housing when the annular bearing seat is screwed into the housing, the annular bearing seat having an out-of-round portion for screwing the annular bearing seat into the housing to position the annular bearing seat at a desired location in the housing, the deformable lip substantially engaging the out-of-round portion of the annular bearing seat when deformed to maintain the position of the annular bearing seat at the desired location, and the deformable lip substantially covering the out-of-round portion of the annular bearing seat in the deformed state to prevent tampering with the adjusted position of the annular bearing seat.

10. The adjustable torque pivot joint as defined in claim 9 wherein the out-of-round portion is a peripheral surface that is spaced radially inwardly of the externally threaded portion of the annular bearing seat in the radial direction and the deformable lip is deformed radially inwardly into engagement with the peripheral surface at a plurality of circumferentially spaced locations.

11. The adjustable torque pivot joint as defined in claim 10 wherein the peripheral surface of the out-of-round portion has a plurality of circumferentially spaced flat surfaces between the circumferentially spaced locations.

12. A method of adjusting torque of a pivot joint comprising:

providing a housing having an open end, an internally threaded portion and a deformable lip at the open end, providing a first bearing seat in the housing, inserting a stud having a shank and a ball head at the end of the shank into the open end of the housing so that the ball head of the stud is disposed in the housing and engages the first bearing seat, providing a second bearing seat and a plug having an externally threaded portion for engaging the internally threaded portion of the housing and an out-of-round, outwardly facing portion for screwing the plug into the housing, screwing the plug into the open end of the housing so that the second bearing seat engages an opposite end of the ball head to retain the ball head in the housing so that the stud rotates and angulates with respect to the housing, continuing screwing the plug into the housing until the member plug is positioned in an adjusted position in the housing to bias the second bearing seat into engagement with the opposite end of the ball head, and deforming the deformable lip to engage and encircle the out-of-round portion of the plug to maintain the adjusted position of the plug and to disable the out-of-round portion to prevent tampering with the adjusted position of the plug.

13. The method as defined in claim 12 wherein, the deformable lip substantially covers the out-of-round portion of the plug when it is deformed to prevent tampering with the adjusted position of the member.

14. The method as defined in claim 13 wherein the out-of-round portion is a peripheral surface that has a plurality of circumferentially spaced flat surfaces.

15. The method as defined in claim 13 wherein the plug is an integral part of the second bearing seat.

16. The method as defined in claim 13 wherein, a spring is inserted into the open end of the housing so that the spring engages one of the bearing seats and biases the one of the bearing seats into engagement with the ball head.

17. The method as defined in claim 13 wherein the out of round portion is a generally hexagonal surface.

18. The method as defined in claim 12 wherein the stud is inserted into the housing ball head first, and the plug is an annular plug that is inserted over the shank and screwed into the open end of the housing.

19. A method of adjusting torque of a pivot joint comprising:

providing a housing having an open end, an internally threaded portion and a deformable lip at the open end, providing a first bearing seat in the housing, inserting a stud having a shank and a ball head at the end of the shank into the open end of the housing so that the ball head of the stud is disposed in the housing and engages the first bearing seat, providing a second bearing seat and a plug having an externally threaded portion for engaging the internally threaded portion of the housing and an out-of-round portion for screwing the plug into the housing, screwing the plug into the open end of the housing so that the second bearing seat engages an opposite end of the ball head to retain the ball head in the housing so that the stud rotates and angulates with respect to the housing, continuing screwing the plug into the housing until the plug is positioned in an adjusted position in the housing to bias the second bearing seat into engagement with the opposite end of the ball head, deforming the deformable lip into engagement with the out-of-round portion of the plug so that it substantially covers the out-of-round portion of the plug to maintain the adjusted position of the plug and to disable the out-of-round portion to prevent tampering with the adjusted position of the plug, and the deformable lip being a cylinder of circular cross section, the out-of-round portion being spaced radially inward of the externally threaded portion of the plug in the radial direction and the deformable lip being deformed radially inwardly to provide a reduced diameter end portion of circular cross section that engages the out-of-round portion of the plug at a plurality of spaced locations.

* * * * *